United States Patent
Farahati et al.

(10) Patent No.: US 10,132,365 B2
(45) Date of Patent: Nov. 20, 2018

(54) REACTION PLATE HAVING A LASER TREATED SURFACE, CLUTCH ASSEMBLY INCLUDING A LASER TREATED REACTION PLATE, AND METHOD OF LASER TREATING A REACTION PLATE

(71) Applicant: Schaeffler Technologies AG & Co. KG, Herzogenaurach (DE)

(72) Inventors: Rashid Farahati, Copley, OH (US); Olusanmi Adeniran, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 35 days.

(21) Appl. No.: 15/077,689

(22) Filed: Mar. 22, 2016

(65) Prior Publication Data
US 2017/0276191 A1 Sep. 28, 2017

(51) Int. Cl.
| F16D 13/52 | (2006.01) |
| F16D 13/64 | (2006.01) |
| B23K 26/00 | (2014.01) |
| F16D 13/70 | (2006.01) |
| B23K 26/36 | (2014.01) |
| F16D 69/00 | (2006.01) |

(52) U.S. Cl.
CPC .............. *F16D 13/70* (2013.01); *B23K 26/36* (2013.01); *F16D 13/52* (2013.01); *F16D 13/648* (2013.01); *F16D 2069/004* (2013.01); *F16D 2250/0038* (2013.01)

(58) Field of Classification Search
CPC ..... F16D 13/52; F16D 13/64; F16D 2069/004
See application file for complete search history.

(56) References Cited

U.S. PATENT DOCUMENTS

| 4,685,202 A * | 8/1987 | Booth | B23K 26/34 |
| | | | 188/161 |
| 4,818,840 A * | 4/1989 | Booth | F16D 27/112 |
| | | | 192/107 R |

(Continued)

FOREIGN PATENT DOCUMENTS

| EP | 0267027 A2 | 11/1988 |
| WO | 2009140148 | 11/2009 |
| WO | PCT/US2015/045043 | 8/2015 |

*Primary Examiner* — Ramya P Burgess
*Assistant Examiner* — David R Morris
(74) *Attorney, Agent, or Firm* — Brooks Kushman P.C.

(57) ABSTRACT

A reaction plate for a clutch including an annular body, the annular body including an inner circumferential edge, an outer circumferential edge, a first surface between the inner and outer circumferential edges and facing a first axial direction and a second surface between the inner and outer circumferential surfaces and facing a second axial direction, the second surface including recesses covering at least 50 percent of the second surface. A clutch assembly including a friction plate, the friction plate having a first axially-facing surface including a friction material, a reaction plate, the reaction plate having a second axially-facing surface including recesses covering at least 50 percent of the second axially-facing surface and an actuation means arranged to displace the friction plate or the reaction plate such that the first and second axially-facing surfaces frictionally engage. A method of fabricating a reaction plate for a clutch.

19 Claims, 8 Drawing Sheets

(56) References Cited

U.S. PATENT DOCUMENTS

| | | | | |
|---|---|---|---|---|
| 4,891,077 | A | * | 1/1990 | Roll ................ F16D 27/112 |
| | | | | 148/512 |
| 4,891,619 | A | * | 1/1990 | Booth .............. F16D 27/112 |
| | | | | 192/84.9 |
| 5,096,036 | A | * | 3/1992 | Booth .............. F16D 27/112 |
| | | | | 192/107 R |
| 5,454,454 | A | | 10/1995 | Easton et al. |
| 5,823,314 | A | | 10/1998 | Suzuki et al. |
| 7,059,459 | B2 | * | 6/2006 | Miyoshi ........... F16D 13/648 |
| | | | | 192/113.31 |
| 9,346,128 | B2 | * | 5/2016 | Moch ................ F16D 69/00 |
| 2004/0074731 | A1 | | 4/2004 | Miyoshi |
| 2005/0126878 | A1 | | 6/2005 | Samie |
| 2007/0062777 | A1 | | 3/2007 | Zagrodzki et al. |
| 2009/0110877 | A1 | * | 4/2009 | Bernard ............ B26F 1/26 |
| | | | | 428/131 |
| 2010/0175964 | A1 | | 7/2010 | Mordukhovich |
| 2013/0004717 | A1 | * | 1/2013 | Moch ................ F16D 69/00 |
| | | | | 428/156 |
| 2014/0131160 | A1 | * | 5/2014 | Tsuda .............. F16D 27/115 |
| | | | | 192/66.3 |
| 2014/0227559 | A1 | * | 8/2014 | Steinmetz ........ B23K 26/0078 |
| | | | | 428/687 |
| 2016/0245344 | A1 | * | 8/2016 | Heitzenrater ..... F16D 13/648 |

* cited by examiner

PRIOR ART

Fig. 8

REACTION PLATE HAVING A LASER TREATED SURFACE, CLUTCH ASSEMBLY INCLUDING A LASER TREATED REACTION PLATE, AND METHOD OF LASER TREATING A REACTION PLATE

TECHNICAL FIELD

The present disclosure relates generally to a reaction plate to be used with a friction plate within a clutch, in particular, to a reaction plate having a laser treated surface to improve the dynamic friction coefficient between the reaction plate and the friction plate of the clutch.

BACKGROUND

Figure 8:
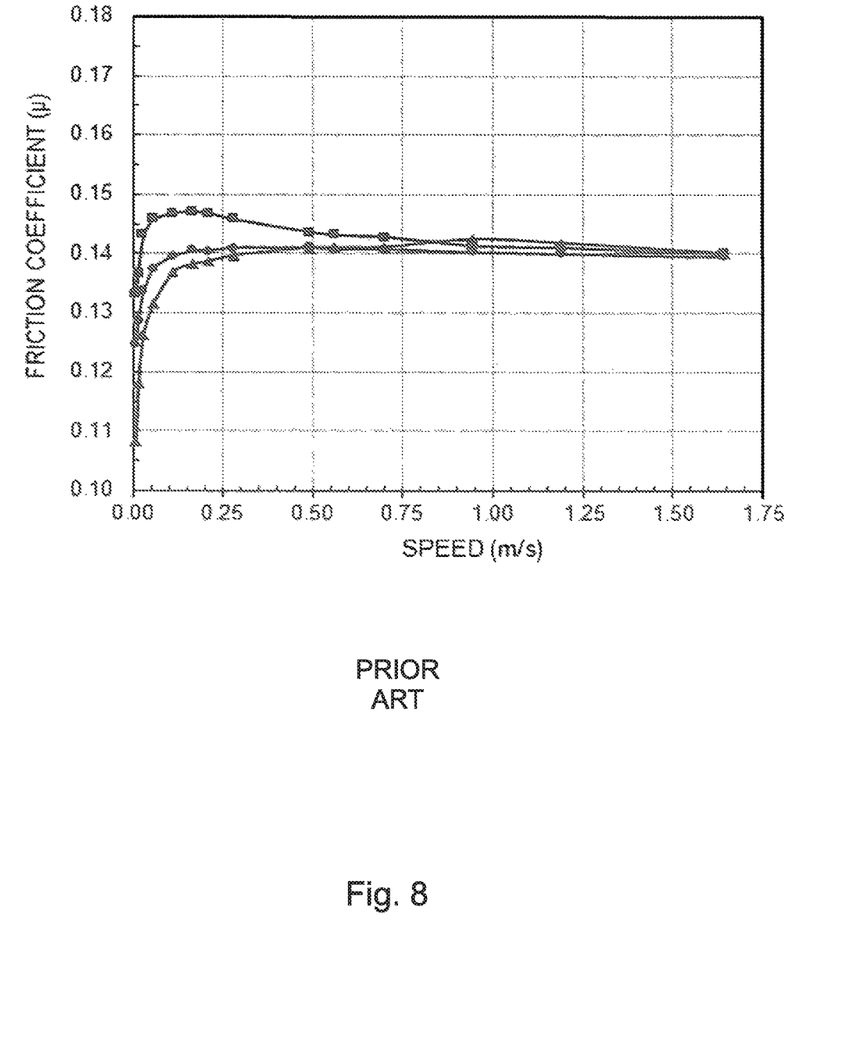

FIG. 8 is a graphic representation of a dynamic friction coefficient of a prior art clutch. The clutch is tested at 120 degrees celsius fluid temperature and at three different loading pressures, namely, 775 Kilopascals (kPa), 1940 kPa, and 2960 kPa. Torque transfer assemblies, for example, clutch assemblies, are useful in a wide variety of applications in the automotive industry including transmissions and differentials. Such torque transfer assemblies include at least one or more plates which interact to transfer torque. In a conventional clutch assembly, a friction plate is arranged to engage a reaction plate and fluid or oil moves around and between the plates to lubricate the reaction plate, absorb heat and reduce drag torque. As clutch speed increases, the higher the dynamic friction coefficient, the better the performance. Friction material can be treated with hot plates to improve the pre break-in performance of the clutch. As shown in FIG. 8 which illustrates dynamic friction coefficient μ for a prior art reaction plate before break-in, as speed of the clutch increases the friction coefficient increases initially and then tapers off. The friction coefficient exhibits a negative gradient and is always below 0.15μ. Due to the low dynamic friction coefficient having a negative gradient before break-in, clutch performance suffers.

SUMMARY

According to aspects illustrated herein, there is provided a reaction plate for a clutch including an annular body, the annular body including an inner circumferential edge, an outer circumferential edge, a first surface between the inner and outer circumferential edges and facing a first axial direction and a second surface between the inner and outer circumferential surfaces and facing a second axial direction, opposite the first axial direction, the second surface including a plurality of recesses covering at least 50 percent of the second surface.

According to aspects illustrated herein, there is provided a clutch assembly including an axis of rotation, a housing rotatable about the axis of rotation, a hub arranged radially inward of the housing and rotatable about the axis of rotation, a friction plate secured to the hub, the friction plate having a first axially-facing surface including a friction material, a reaction plate secured to the housing, the reaction plate having a second axially-facing surface including a plurality of recesses that covers at least 50 percent of the second axially-facing surface and an actuation means arranged to displace the friction plate or the reaction plate such that the first and second axially-facing surfaces frictionally engage.

According to aspects illustrated herein, there is provided a method of fabricating a reaction plate for a clutch including the steps of forming a reaction plate for the clutch, the reaction plate having a first axially-facing surface, applying a pulsed beam from a laser machine to the first axially-facing surface, forming a plurality of recesses in the first axially-facing surface with the pulsed beam and covering at least 50 percent of the first axially-facing surface with the plurality of recesses.

According to aspects illustrated herein, there is provided a reaction plate for a clutch including an annular body, the annular body including an inner circumferential edge, an outer circumferential edge, a first surface between the inner and outer circumferential edges and facing a first axial direction and a second surface between the inner and outer circumferential surfaces and facing a second axial direction, opposite the first axial direction, where the second surface includes a plurality of recesses.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. The term "approximately" is intended to mean values within ten percent of the specified value.

Figure 1:
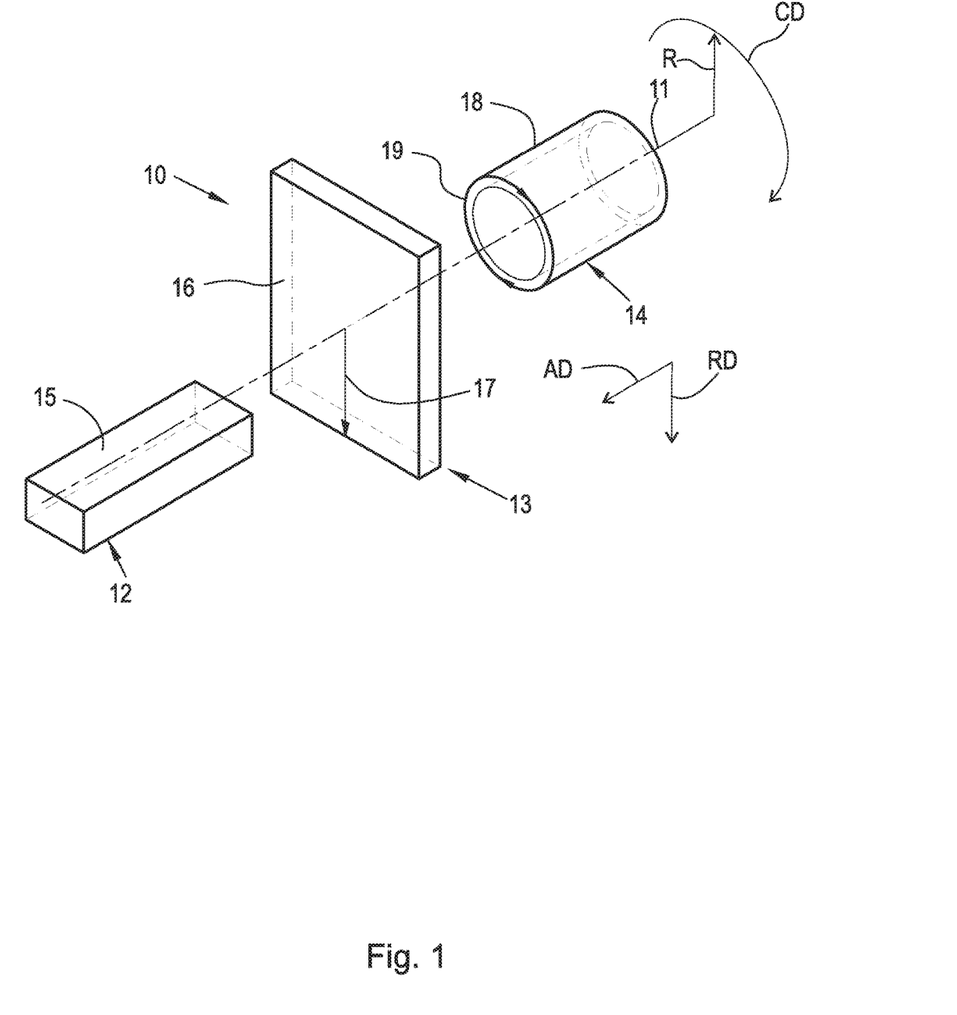
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
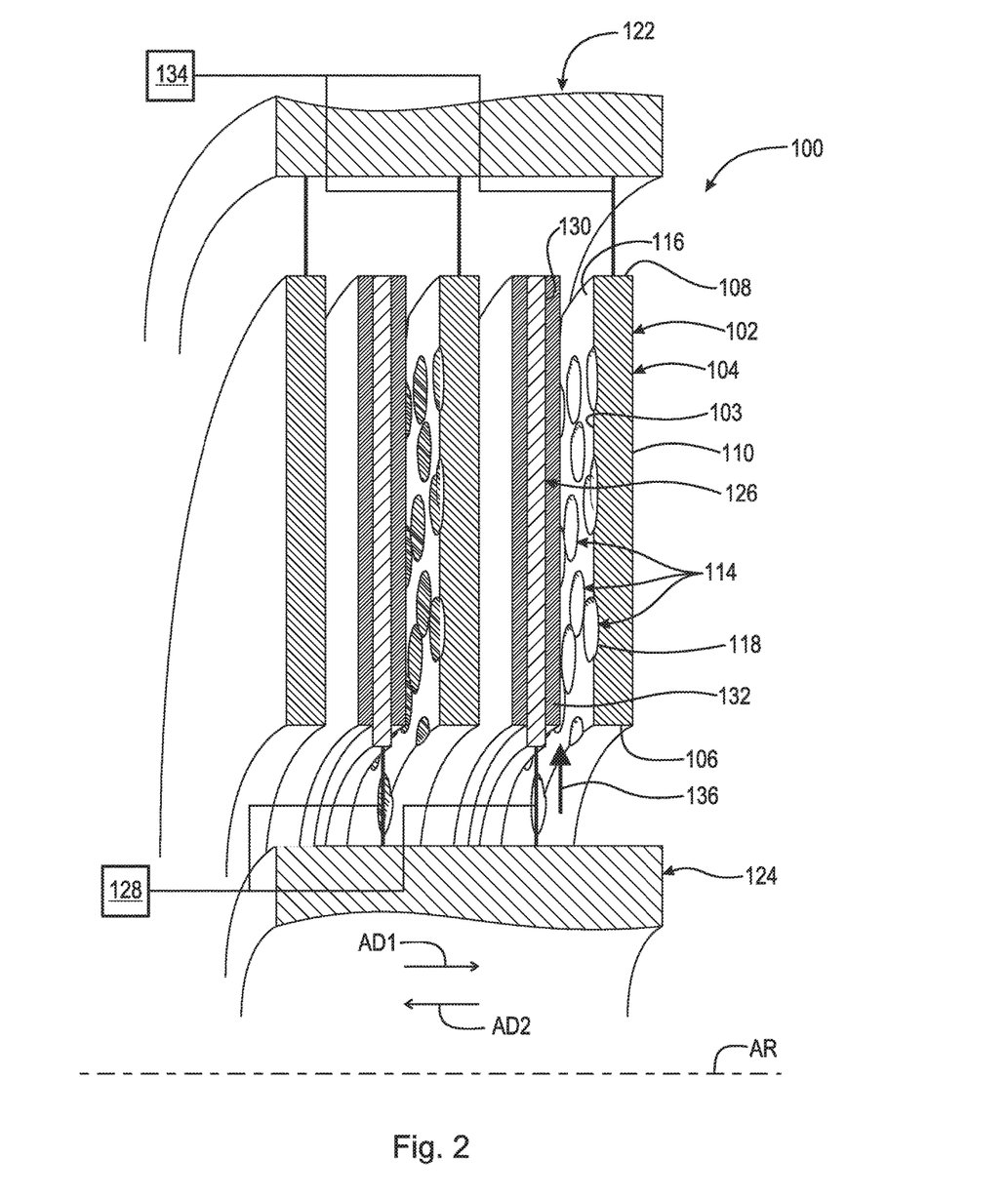
FIG. 2 is a schematic cross-sectional view of an upper half portion of a clutch assembly including a reaction plate having a laser treated surface.

FIG. 2 is a schematic cross-sectional view of an upper half portion of clutch assembly 100 including reaction plate 102 having laser treated surface 103.

Figure 3A:
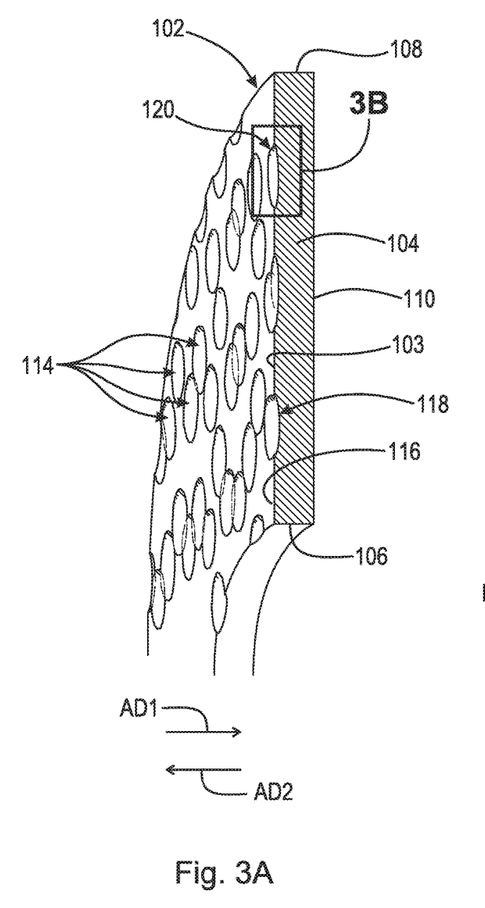
FIG. 3A is a schematic cross-sectional view of the reaction plate having a laser treated surface of FIG. 2.

FIG. 3A is a schematic cross-sectional view of reaction plate 102 having laser treated surface 103 of FIG. 2.

Figure 3B:
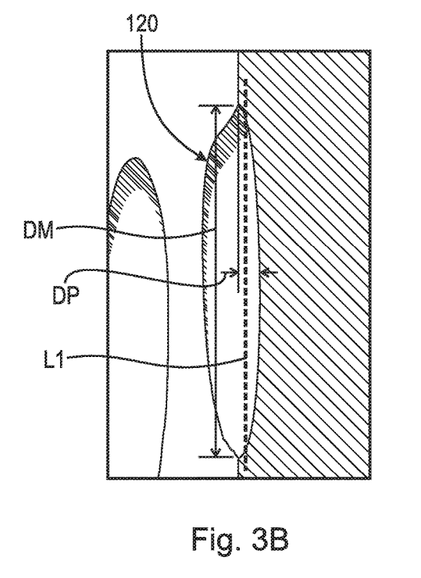
FIG. 3B is an enlarged view of area 3B in FIG. 3A.

FIG. 3B is an enlarged view of area 3B in FIG. 3A.

Figure 4:
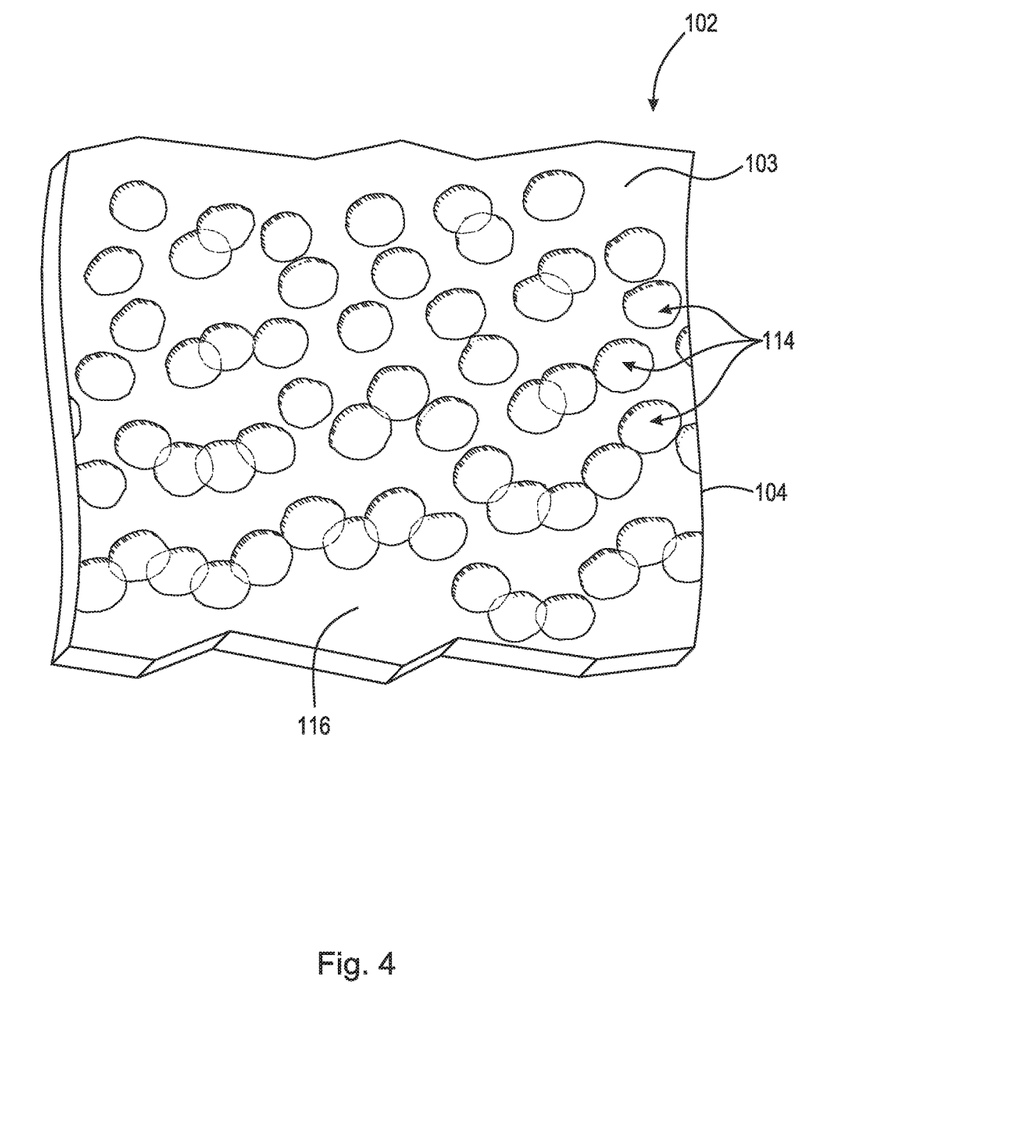
FIG. 4 is a detailed front view of a portion of the reaction plate of FIG. 3A.

FIG. 4 is a detailed view of a portion of reaction plate 102 of FIG. 3A. The following should be viewed in light of FIGS. 2 through 4. Clutch assembly 100 includes reaction plate 102. Reaction plate 102 includes annular body 104 which includes inner circumferential edge 106, outer circumferential edge 108, and surfaces 110 and 103. Surface 110 is arranged between inner and outer circumferential edges 106 and 108 and faces axial direction AD1. Surface 103 is arranged between inner and outer circumferential surfaces 106 and 108 and faces axial direction AD2, opposite axial direction AD1. Surface 103 includes recesses 114 that cover at least 50 percent of surface 103.

In an example embodiment, reaction plate 102 is free of any openings radially outward of inner circumferential edge 106. In other words, reaction plate 102 is free of any openings radially outward of inner circumferential edge 106 and radially inward of outer circumferential edge 108. Surface 103 includes planar portion 116 and at least portion 118 of recesses 114 extends from planar portion 116 in axial direction AD1. Due to the arrangement of recesses 114, line L1, parallel to planar portion 116, passes through recess 120 of recesses 114 without intersecting planar portion 116.

In an example embodiment, recesses 114 cover approximately 75 percent of surface 103. In an example embodiment, recesses 114 cover nearly 100 percent of surface 103. In an example embodiment, recesses 114 cover any amount of surface area of surface 103 between 50 and 100 percent. In an example embodiment, recesses 114 cover less than 50 percent of surface 103. In an example embodiment, recesses 114 are arranged irregularly over surface 103. In an example embodiment, recesses 114 are evenly distributed across surface 103. In other words, recesses 114 can be arranged such that the same distance exists between each recess in radial or circumferential directions.

Each recess 114, for example recess 120, is defined by diameter DM in the range of approximately 60-300 micrometers (mm) (or approximately 0.002-0.012 inches). In an example embodiment, diameter DM is in the range of approximately 70-90 micrometers (or approximately 0.0027-0.0035 inches). In an example embodiment, diameter DM is approximately 80 micrometers (or approximately 0.003 inches). Additionally, each recess 114, for example recess 120, is defined by depth DP in the range of approximately 3-20 micrometers (or approximately 0.0001-0.0007 inches). In an example embodiment, depth DP is approximately 8 micrometers (or approximately 0.0003 inches). In an example embodiment, recess 120 has: diameter DM in the range of approximately 60-300 micrometers (or approximately 0.002-0.012 inches) or depth DP in the range of approximately 3-20 micrometers (or approximately 0.0001-0.0007 inches). The discussion above pertaining to recess 120 applies to any or all of recesses 114.

Clutch assembly 100 includes axis of rotation AR, reaction plate 102, housing 122, hub 124, friction plate 126 and actuation means 128. Housing 122 is rotatable about axis of rotation AR. Hub 124 is arranged radially inward of housing 122 and rotatable about axis of rotation AR. Friction plate 126 is drivingly engaged to hub 124 and includes axially-facing surface 130 including friction material 132. Reaction plate 102 is drivingly engaged to housing 122 and includes axially-facing surface 103 including recesses 114 that cover at least 50 percent of axially-facing surface 103. Actuation means 128 or 134 is arranged to displace friction plate 126 or reaction plate 102 such that axially-facing surfaces 130 and 103 frictionally engage. In an example embodiment, clutch assembly 100 includes friction plate 126 secured to housing 122 and reaction plate 102 secured to hub 124.

When friction plate 126 and reaction plate 102 frictionally engage, fluid 136 is arranged to flow through recesses 114. Friction material 132 is any suitable friction material known in the art.

In an example embodiment, clutch assembly 100 includes additional friction plates and reaction plates as shown in FIG. 2.

Figure 5A:
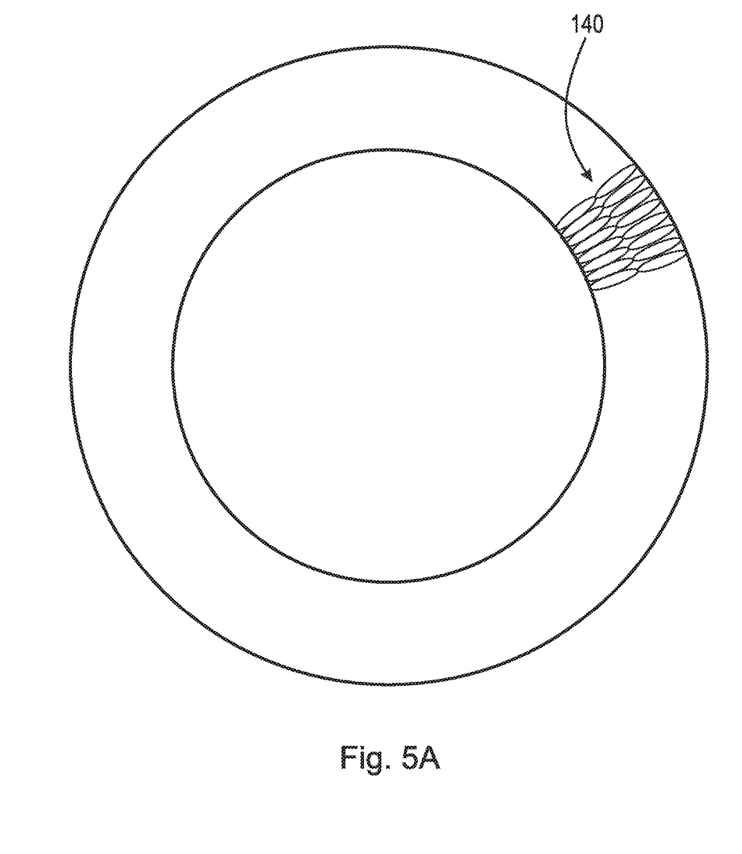
FIG. 5A is a schematic front view of a reaction plate having a portion laser treated with a pattern.
Figure 5B:
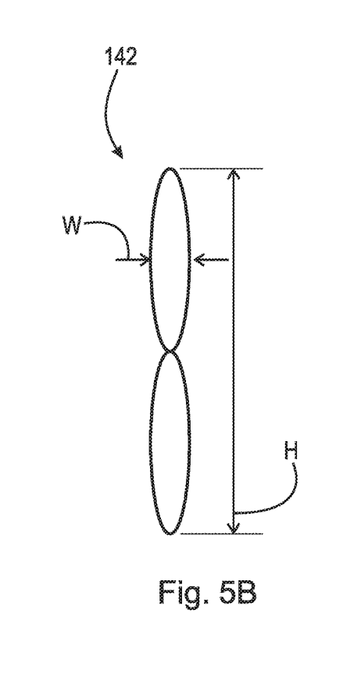
FIG. 5B is a schematic view of the pattern used in FIG. 5A.
Figure 6:
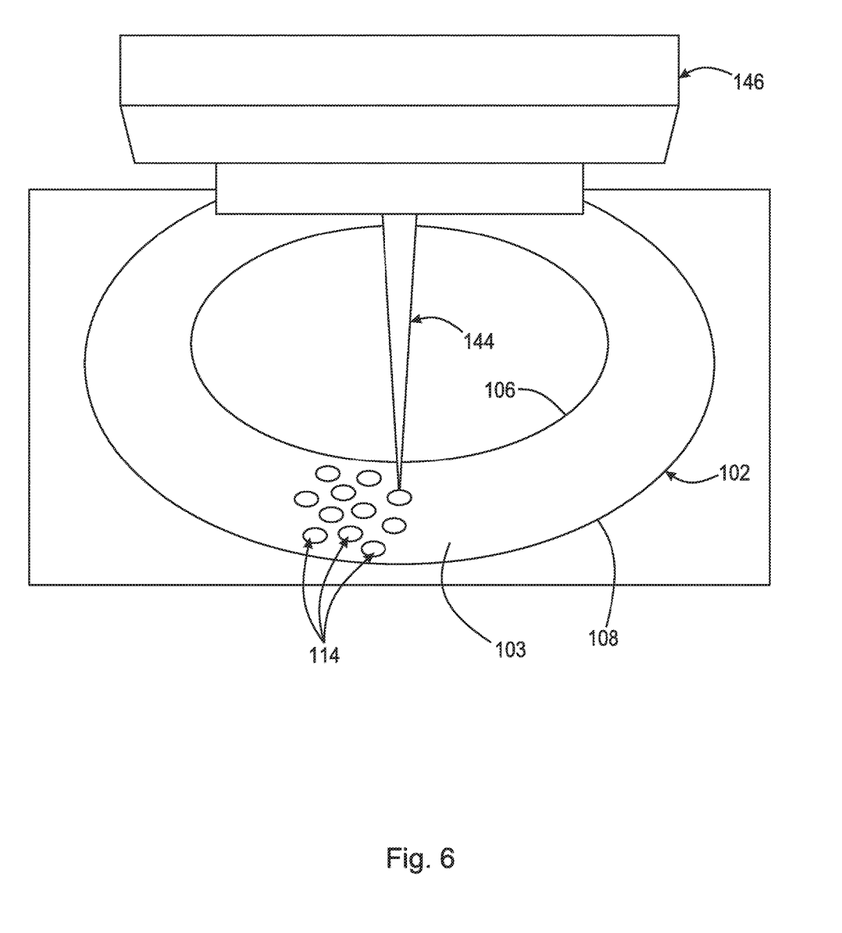
FIG. 6 is a schematic view of an example method of forming recesses in the reaction plate of FIG. 5A.

FIG. 5A is a schematic front view of reaction plate 102 having portion 140 laser treated with pattern 142. FIG. 5B is a schematic view of pattern 142 of FIG. 5A. FIG. 6 is a schematic view of an example method of forming recesses 114 in reaction plate 102. The following describes an example method of forming laser treated reaction plate 102 which should be viewed in light of FIGS. 2 through 6. Although the method is presented as a sequence of steps for clarity, no order should be inferred from the sequence unless explicitly stated. A first step forms reaction plate 102 for clutch assembly 100 including axially-facing surface 103. A second step applies pulsed beam 144 from laser machine 146 to axially-facing surface 103. A third step forms recesses 114 in axially-facing surface 103 with pulsed beam 144. A fourth step covers at least 50 percent of the first axially-facing surface with recesses 114.

In an example embodiment, a fifth step displaces plate 102 or machine 146 and a sixth step repeats the second and third steps to form additional recesses 114.

In an example embodiment, forming recesses 114 includes forming at least one recess includes height H and width W. In an example embodiment, forming recesses 114 includes forming pattern 142 where pattern 142 is in the shape of ∞, or a FIG. 8. In an example embodiment, forming recesses 114 includes forming at least one recess or pattern 142 including: a height H of approximately 25 mm (or approximately 0.984 inches) or a width W of approximately 1.5 mm (or approximately 0.059 inches). Reaction plate 102 is scanned to include pattern 142 which is regular while forming recesses 114. In an example embodiment, beam 144 is emitted in a regular pattern designed on the machine software. In an example embodiment, FIG. 8 pattern 142 is standard for all part sizes, but pattern height H and width W of pattern may vary depending on size. In an example embodiment, height H is at least 3 mm more than the effective radius of the part.

It should be appreciated that any Q-switched fiber laser optimized for micro and marking applications is contemplated for laser machine 146. A suitable laser machine 146 is the Rofin PowerLine F100 available from Rofin located in Germany.

A seventh step defines and inputs optimal parameters that produces a desired treatment for surface 103 into laser machine 146. In an example embodiment, at least one of the following is inputted into laser machine 146: a lens focal length of 170 mm (or approximately 6.693 inches) and a 1.5× beam expander. The lens focal length is related to the depth of the recesses that can be achieved at focus. In an example embodiment, focus is set at +3.00 mm (or approximately 0.118 inches) from nominal focus and this is standard for all part sizes. The beam expander determines recess size. The expander gives a ~80 μm (or approximately 0.003 inches) recess size, which can be a standard for all part sizes.

In an example embodiment, at least one of the following is inputted into laser machine 146: a laser emission speed of 15 m/s (or approximately 33.54 miles per hour), a laser scanning velocity across circular reaction plate 30 degrees/sec, a laser pulse frequency of 90 Kilohertz (KHz), and a laser power of 95 watts (W) is inputted into laser machine 146. Emission speed measures how fast the pulse laser is released from machine 146 to scan reaction plate 102. Laser scanning velocity refers to the velocity at which reaction plate 102 is rotated on a table as beam 144 is released from laser machine 146 to create recesses 114 across surface 103 of annular body 104. The total revolution is divided by required laser etch time, for example, 30 degrees/sec. This value has to be adjusted with different part sizes. The pulse laser frequency is the number of pulses released per second. In an example embodiment, the pulse laser frequency is 90 KHz and the same is applicable for all part sizes. Laser power affects the consistency and size of recesses 114 formed. In an example embodiment, a laser power of 95 W is used.

Figure 7:
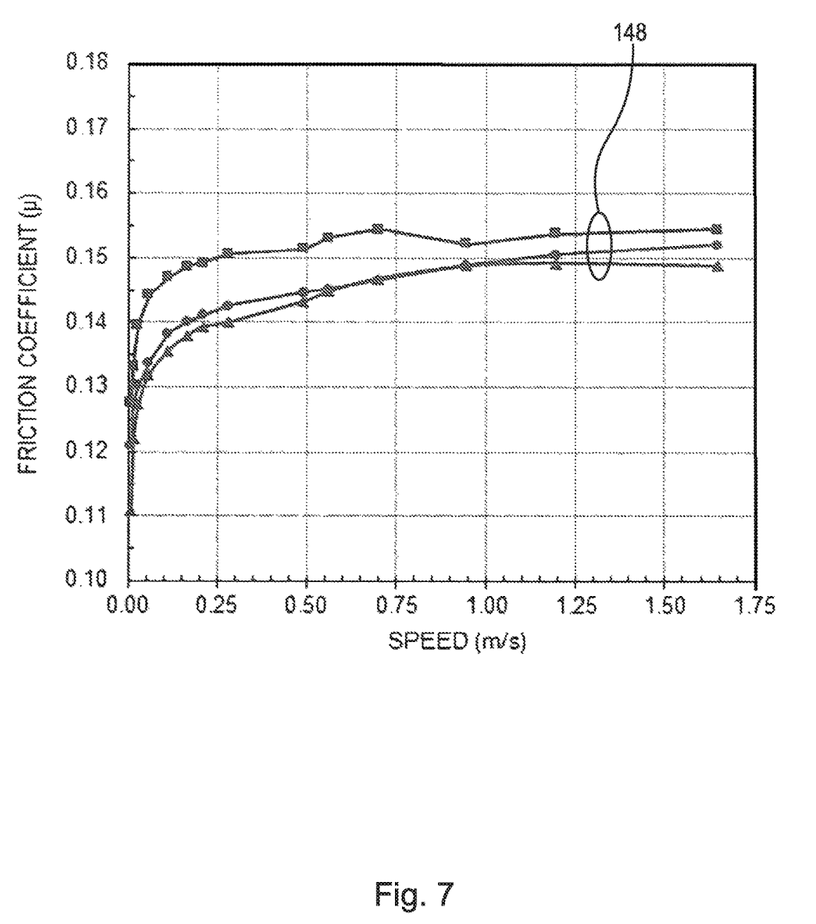
FIG. 7 is a graphic representation of the dynamic friction coefficient of the clutch assembly of FIG. 2; and, FIG. 8 is a graphic representation of a dynamic friction coefficient of a typical clutch.

FIG. 7 is a graphic representation of dynamic friction coefficient μ of clutch assembly 100 of FIG. 2 including laser treated reaction plate 102. Like the clutch represented in FIG. 8, the clutch represented in FIG. 7 is tested at 120 degrees celsius fluid temperature and at three different loading pressures, namely, 775 Kilopascals (kPa), 1940 kPa, and 2960 kPa. As opposed to dynamic friction coefficient μ shown in FIG. 8, plots 148 of dynamic friction coefficient μ of laser treated reaction plate 102 shown in FIG. 7 (before break-in) increase initially and then continue to increase rather than tapering off as speed of clutch 100 increases. Dynamic friction coefficient μ in FIG. 7 exhibits a positive gradient unlike the negative gradient shown in FIG. 8. Plots 148 shown in FIG. 7 nearly reach or exceed 0.15μ. Due to the increased dynamic friction coefficient μ of clutch assembly 100 before break-in, clutch performance improves. Additionally, due to the presence of recesses 114, fluid 136, such as, an oil-based lubricant, drains faster as friction plate 126 and reaction plate 102 frictionally engage. If too much oil builds up between friction material 132 and reaction plate 102, the dynamic friction coefficient decreases due to a type of hydroplaning phenomenon. The increased dynamic friction coefficient discussed above occurs when fluid 136 is drained quickly.

In an example embodiment, reaction plate 102 is stamped steel or aluminum. In example embodiment, reaction plate 102 is casted steel or aluminum.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A clutch assembly, comprising:
an axis of rotation;
a housing rotatable about the axis of rotation;
a hub arranged radially inward of the housing and rotatable about the axis of rotation;
a friction plate drivingly engaged to either the hub or the housing, the friction plate having a first surface, facing in a first axial direction, including a friction material;
a reaction plate drivingly engaged to either the hub or the housing, the reaction plate having a second surface, facing a second axial direction opposite the first axial direction, including a planar portion and a plurality of grouped recesses, wherein each grouped recess includes one or more recesses, wherein the planar portion separates the grouped recesses; and,
an actuation means arranged to displace the friction plate or the reaction plate such that the first and second surfaces frictionally engage and disengage.

2. The clutch assembly of claim 1, wherein:
when the friction plate and the reaction plate are frictionally engaged, fluid is arranged to flow through the plurality of recesses.

3. The clutch assembly of claim 1, wherein the plurality of recesses covers at least 75 percent of the second surface.

4. The clutch assembly of claim 1, wherein:
at least one recess of the plurality of recesses has:
a diameter in a range of approximately 60-300 micrometers; or,
a depth in a range of approximately 3-20 micrometers.

5. The clutch assembly of claim 1, wherein at least one of the plurality of grouped recesses includes only one recess.

6. The clutch assembly of claim 1, wherein at least one of the plurality of grouped recess includes two or more recesses that overlap.

7. The clutch assembly of claim 1, wherein each of the plurality of recesses comprises a substantially round hole-shaped geometry.

8. The clutch assembly of claim 1, wherein each of the plurality of recesses comprises a round hole.

9. The clutch assembly of claim 1, wherein:
at least a portion of the plurality of grouped recesses extends from the planar portion in the first axial direction.

10. The clutch assembly of claim 9, wherein:
a line, parallel to the planar portion, passes through at least one recess of the plurality of grouped recesses without intersection the planar portion.

11. A clutch assembly, comprising:
a housing rotatable about an axis of rotation;
a hub arranged radially inward of the housing and rotatable about the axis of rotation;
a friction plate engaged to either the hub or the housing, the friction plate having a first surface including a friction material;
a reaction plate engaged to either the hub or the housing, the reaction plate having a second surface including a planar surface and a plurality of grouped recesses, wherein each grouped recess includes one or more recesses, wherein the planar portion separates the grouped recesses.

12. The clutch assembly of claim 11, wherein the clutch assembly further includes an actuation means to displace the friction plate or the reaction plate such that the first and second surfaces engage and disengage.

13. The clutch assembly of claim 11, wherein one or more recesses in the grouped recess overlap one another.

14. The clutch assembly of claim 11, wherein the one or more of recesses in the grouped recess are irregularly arranged.

15. The clutch assembly of claim 11, wherein the plurality of grouped recesses are laser treated.

16. The clutch assembly of claim 11, wherein the plurality of grouped recesses cover at least 50 percent of the second surface.

17. The clutch assembly of claim 11, wherein the plurality of grouped recesses covers at least 25 percent of the second surface.

18. The clutch assembly of claim 11, wherein the plurality of grouped recesses covers at least 25 percent of the second surface.

19. The clutch assembly of claim 11, wherein the plurality of grouped recesses covers less than 50 percent of the second surface.

* * * * *